United States Patent Office 3,053,742
Patented Sept. 11, 1962

3,053,742
IRRADIATION CROSS-LINKING OF COPOLYMERS
Wendell V. Smith, Nutley, N.J., assignor to United States Rubber Company, New York, N.Y., a corporation of New Jersey
No Drawing. Filed Mar. 17, 1958, Ser. No. 721,690
8 Claims. (Cl. 204—154)

This invention relates to a method of improving the properties of certain copolymers of vinyl chloride, and more particularly it relates to the irradiation of certain copolymers of vinyl chloride with ionizing radiation, as well as to the improved products so produced.

The invention is based on the discovery that certain copolymers of vinyl chloride are cross-linked, and thereby rendered insoluble and otherwise improved in physical properties, by treatment with relatively small doses of ionizing radiation. The novel copolymers so produced are especially characterized by enhanced usefulness at elevated temperatures, because at such elevated temperatures their tensile strength and elongation are greatly improved and their tendency to flow is greatly decreased, in comparison with similar copolymers that have not been treated according to the invention, and with conventional vinyl chloride resins, whether irradiated or not.

It has previously been known to treat certain polymeric materials, notably polyethylene, with ionizing radiation, and thereby obtain improvements in polymer properties. Prior art treatment of conventional vinyl chloride polymers and copolymers with such radiation has, however, given no such beneficial results. Treatment of such conventional vinyl chloride resins has been reported by Lawton, Bueche and Balwit (Nature 172, 76 (1953)), by Ryan Nucleonics 11, 13 (1953)), by Sisman and Bopp (Oak Ridge National Laboratories report ORNL 928, 6/29/51), and by Gehman and Hobbs (Rubber World 130, 643 (1954)). These workers found no major effect of treatment with moderate amounts of ionizing radiation, while larger doses gave discoloration and extensive chemical degradation of the resin. It is therefore completely unexpected to find that cross-linking and its attendant beneficial effects on physical properties occurs when the resins to which my invention is applicable, comprising copolymers of vinyl chloride with minor amounts of certain selected monomers, are irradiated with small and non-injurious dosages of ionizing radiation.

The copolymers of vinyl chloride to which the invention is applicable include the high molecular weight resinous copolymers of vinyl chloride with one or more of the following comonomers in suitably chosen proportions:

(a) dialkyl maleates and fumarates in which each alkyl group contains 4 or more (usually 4 to 20) carbon atoms;
(b) vinyl esters of fatty acids in which the fatty acid contains 3 or more (usually 3 to 20) carbon atoms;
(c) vinyl alkyl ethers in which the alkyl group contains 18 or more (usually 18 to 30) carbon atoms;
(d) alkyl acrylates in which the alkyl group contains 1 or more (usually from 1 to 20) carbon atoms; and
(e) alkyl methacrylates in which the alkyl group contains 3 or more (usually from 3 to 20) carbon atoms.

The copolymers of vinyl chloride employed in the invention contain from about 5% to about 50% of one or more of the foregoing comonomers, and correspondingly 95% to 50% of vinyl chloride. Preferred vinyl chloride copolymers contain 10% to 40% of the comonomer.

The effect of ionizing radiation on the foregoing copolymers of vinyl chloride is in decided contrast to the effect of such radiation on polyvinyl chloride resin itself, or on other copolymers of vinyl chloride. Vinyl chloride polymer itself, or copolymers of vinyl chloride other than those here specified, do not respond to treatment with ionizing radiation in the same manner as the present copolymers. Polyvinyl chloride, or copolymers of vinyl chloride other than the present ones, are not converted into appreciably more useful materials by moderate dosages of ionizing radiation, unlike the present copolymers which are greatly enhanced in utility by moderate dosages. Polyvinyl chloride and copolymers of vinyl chloride other than the present ones must be subjected to excessively large, uneconomical dosages of radiation before marked changes occur, and such large dosages are accompanied by definite degradation of the materials, so that no practical, useful result is obtained. Apparently the relatively long chain length of the comonomers in the present vinyl chloride copolymers somehow markedly increases the ability of the materials to be cross-linked by ionizing radiation, to the extent that highly beneficial effects can be realized with moderate, economical dosages, before harmful degradation of the vinyl chloride "spine" of the copolymer sets in. Whatever the theory or explanation, it is most surprisingly found that the present limited class of copolymers yields unexpected results that differ in kind as a practical matter, rather than in mere degree, from the results obtained with polyvinyl chloride, or copolymers containing only very small amounts of comonomers as well as copolymers containing comonomers of only very short chain length. Evidently the comonomer must introduce side chains of appreciable length, and must be present in appreciable proportion (at least 5%) in order to render the copolymer operable in the present invention. In general, the higher the proportion of the comonomer, and/or the longer the chain of the comonomer, the less radiation is required to provide a given degree of improvement. Conversely, the smaller the proportion of comonomer and/or the shorter the comonomer molecule, the greater is the dosage of radiation required before cross-linking becomes evident. These principles are novel, insofar as the present inventor is aware.

A highly preferred aspect of the invention contemplates the inclusion, in the copolymer being treated, of a substantial proportion (e.g. 5 to 80 parts per 100 parts of copolymer) of a reinforcing filler, especially carbon blacks or their known equivalent small particle size fillers, such as silica. Carbon black or its equivalent are remarkable for their ability to render the irradiated copolymer especially strong at high temperature, as evidenced by improved high temperature tensile strength. The benefit obtained is far beyond anything that would be expected from the known effects of reinforcing fillers in the non-irradiated copolymer. It therefore appears that when the copolymer containing carbon black or the like is irradiated, a new cooperation occurs between the filler and the copolymer as a result of the irradiation, whereby the filler produces a more profound reinforcement than would be expected. Evidently the filler somehow participates in the cross-linking reaction which the ionizing radiation produces in the copolymer, so that the copolymer and the filler may, in effect, somehow actually become chemically united. Whatever the theory, the benefits obtained in practice are observed to be far in excess of what would be expected.

The term "ionizing radiation" is used herein in its usual broad sense to denote any so-called radiation capable of producing ionization, and specifically includes X-rays, gamma rays, beta rays, and high speed material particles, such as electrons, neutrons, protons and alpha particles, however produced. As shown by the data given in Table 10A on pages 106 through 115 of Field and Franklin "Electron Impact Phenomena and Properties of Gaseous Ions" (Academic Press, Inc. 1957), radiation having an energy level equivalent to at least about 8 electron volts is effective in producing ionization. Such radiation will hereinafter be referred to as "ionizing radiation." Electrons having energy greater than about 200,000 electron volts are particularly suitable, and very good results are obtained with electrons accelerated through 2-million volts, especially with thicker articles. The nature of the primary radiation is not important, however, since most of the effect is believed to be brought about by secondary, tertiary, etc. electrons split off from the material by the primary particles or electromagnetic radiation. Thus, high energy photons (electromagnetic radiation) are also effective. While soft X-rays may be used, hard X-rays are preferred (i.e. those produced from electrons having quantum energies in the range of 1 mev. or higher), especially when treating thicker articles. Gamma radiation may be obtained from such sources as $Co^{60}$, or an operating nuclear reactor, or from waste fission products of a nuclear reactor. High speed neutrons, while they are effective in producing cross-links, are not usually a preferred form of radiation for use in my invention, since chlorine is converted into a radioactive isotope by neutrons.

In accordance with the invention, I provide the previously prepared vinyl chloride copolymer resin (of the class previously defined), and shape it into a desired useful shaped form such as a film, tube, container, coating, molded article, etc., and thereafter I subject the shaped form to ionizing radiation. The dosage is suitably such that from about 5 to about 50 watt-hours are absorbed per pound of plastic material under treatment. Appreciably higher dosages, e.g., 100 watt-hours and up, produce definite degradation of the material, and so are unsuitable for use in the invention, aside from the fact that such high dosages would be uneconomical.

It will be understood that the plastic material being treated must be shaped at least generally into a desired form prior to the treatment with ionizing radiation, because after the treatment the plastic is cross-linked, and difficult to shape.

The following examples, in which all parts are expressed by weight, illustrate the invention in more detail. In the examples, the source of the ionizing radiation was a 2-million volt Van de Graaff accelerator. This accelerator supplied a beam of electrons which had been accelerated through a voltage drop of 2-million volts. Samples in the form of slabs 6½" x 6½" x 0.1" were put under the beam for periods sufficient to give the dosages given in the various tables. The dosages are reported in units of watt-hours of ionizing energy absorbed per pound of material treated. The dosages reported apply especially to the material in the immediate neighborhood of the surface exposed to the beam. Due to the nature of the absorption of energy from a beam of high speed electrons, the material somewhat below the surface absorbed somewhat more energy than the material at the surface. The characteristic absorption of energy by material in an electron beam is discussed in U.S. Patent 2,805,072 and is illustrated particularly by FIGURES 3 and 4 of that patent. Solubility in cyclohexanone was used as a criterion for cross-linking.

EXAMPLE I

This example does not illustrate the invention, but shows, for subsequent comparison with the invention, the effect of ionizing radiation on vinyl chloride homopolymer. The material treated had the following composition:

| | Parts |
|---|---|
| Polyvinyl chloride | 100 |
| Plasticizer (dioctyl phthalate) | 50 |
| Lubricant (calcium stearate) | 3 |

The physical properties measured on samples treated with varying dosages of ionizing radiation, up to 60 watt-hours per pound, are shown in Table I. It will be evident that there is no definite change in physical properties. However, the material did become dark in color at the higher dosages (over 40 watt-hours/lb.). As shown in Table II, this same mix showed no change in solubility, until the dosage became objectionably high (100 watt-hours), by which time the polymer had become seriously degraded.

Table I

IRRADIATION OF PLASTICIZED POLYVINYL CHLORIDE

| Irradiation (watt-hrs./lb.) | 0 | 20 | 40 | 60 |
|---|---|---|---|---|
| Room temp.—Tensile, lb./in.² | 2,290 | 2,210 | 2,190 | 2,160 |
| 180° F.—Tensile, lb./in.² | 643 | 586 | 706 | 678 |
| Room temp.—Elong., Percent | 260 | 290 | 280 | 260 |
| 180° F.—Elong., Percent | 470 | 520 | 530 | 400 |
| Durometer hardness (Shore A) | 75 | 81 | 80 | 79 |
| 100% modulus, lb./in.² | 1,075 | 1,050 | 1,000 | 1,000 |

Table II

SOLUBILITY OF IRRADIATED PLASTICIZED POLYVINYL CHLORIDE

| Dosage (Watt-hrs./lb.): | Effect (in cyclohexanone): |
|---|---|
| 0 | Soluble. |
| 24 | Do. |
| 50 | Do. |
| 100 | Swells but only partially dissolves. |

EXAMPLE II

This example, like Example I, does not illustrate the invention, but merely shows, for comparison, that a certain copolymer outside the scope of the invention does not provide the desired results. Mixes having the composition shown in Table III were prepared from a commercial vinyl chloride-vinyl acetate copolymer containing 4% of vinyl acetate. The mixes were subjected to varying amounts of ionizing radiation, without any detectable effect on the physical properties. The treated samples remained completely soluble in cyclohexanone.

Table III

IRRADIATION OF VINYL CHLORIDE-VINYL ACETATE COPOLYMER

| Mix | A | B | C | D |
|---|---|---|---|---|
| Polyvinyl chloride | 50 | 50 | | |
| Vinyl chloride-vinyl acetate copolymer | 50 | 50 | 100 | 100 |
| Dioctyl phthalate | 50 | 50 | 50 | 50 |
| Calcium stearate | 1 | 1 | 1 | 1 |
| Carbon black (Phil-black O) | | 50 | | 50 |

Durometer hardness, Shore A

| Mix, watt-hrs./lb. | A | B | C | D |
|---|---|---|---|---|
| 0 | 78 | 90 | 78 | 90 |
| 10 | 79 | 91 | 75 | 91 |
| 20 | 79 | 92 | 76 | 91 |
| 40 | 78 | 91 | 75 | 92 |

100% modulus, lb./in.²

| | A | B | C | D |
|---|---|---|---|---|
| 0 | 1,150 | 1,750 | 1,150 | 1,850 |
| 10 | 1,000 | 1,800 | 1,050 | 1,800 |
| 20 | 1,075 | 1,800 | 1,075 | 1,750 |
| 40 | 1,075 | 1,900 | 1,050 | 1,800 |

Room temp.—Tensile, lb./in.²

| | A | B | C | D |
|---|---|---|---|---|
| 0 | 2,300 | 2,370 | 2,350 | 2,460 |
| 10 | 2,410 | 2,770 | 2,570 | 3,060 |
| 20 | 2,320 | 2,930 | 2,870 | 2,920 |
| 40 | 2,300 | 2,920 | 2,550 | 3,010 |

Table III—Continued
IRRADIATION OF VINYL CHLORIDE-VINYL ACETATE COPOLYMER—Continued

220° F.—Tensile

| | | | | |
|---|---|---|---|---|
| 0 | 296 | 616 | 285 | 528 |
| 10 | 233 | 378 | 298 | 433 |
| 20 | 178 | 468 | 287 | 513 |
| 40 | 257 | 457 | 306 | 489 |

260° F.—Tensile

| | | | | |
|---|---|---|---|---|
| 0 | 144 | 300 | 103 | 329 |
| 10 | 101 | 161 | 102 | 228 |
| 20 | 101 | 269 | 100 | 237 |
| 40 | 88 | 244 | 125 | 201 |

Room temp.—Elongation, percent

| | | | | |
|---|---|---|---|---|
| 0 | 300 | 80 | 340 | 90 |
| 10 | 290 | 100 | 290 | 130 |
| 20 | 260 | 90 | 280 | 110 |
| 40 | 250 | 100 | 270 | 120 |

220° F.—Elongation, percent

| | | | | |
|---|---|---|---|---|
| 0 | 400 | 180 | 520 | 180 |
| 10 | 420 | 170 | 530 | 140 |
| 20 | 320 | 210 | 500 | 220 |
| 40 | 430 | 200 | 590 | 290 |

260° F.—Elongation, percent

| | | | | |
|---|---|---|---|---|
| 0 | 280 | 170 | 300 | 140 |
| 10 | 310 | 150 | 270 | 130 |
| 20 | 260 | 160 | 280 | 180 |
| 40 | 260 | 160 | 330 | 170 |

EXAMPLE III

This example illustrates the invention, and the results are directly contrary to those observed in Examples I and II. A terpolymer was prepared from vinyl chloride, dilauryl maleate and vinyl stearate (monomer feed ratio 80:15:5). The terpolymer was compounded as shown in Table IV, and subjected to varying doses of ionizing radiation. Remarkable improvements in physical properties were obtained even with only moderate dosages of irradiation. The most striking change is the increased tensile strength at elevated temperatures. The data also show that the beneficial effects of irradiation are even more evident when a reinforcing filler is incorporated in the mix. This augmenting effect by reinforcing fillers is an important aspect of the invention.

Whereas the terpolymer was soluble in cyclohexanone before treatment, it was insoluble after treatment.

Table IV
IRRADIATION OF PLASTICIZED TERPOLYMER
[Polymer from feed: 80 vinyl chloride, 15 dilauryl maleate and 5 vinyl stearate]

| Mix | A | B | C | D | E |
|---|---|---|---|---|---|
| Terpolymer | 100 | 100 | 100 | 100 | 100 |
| Calcium stearate | 1 | 1 | 1 | 1 | 1 |
| Dioctyl phthalate | 20 | 20 | 20 | 20 | 20 |
| Carbon black ("Philblack O") | | 25 | 50 | | |
| Silica filler ("Hi Sil") | | | | 54 | |
| Silica filler ("Silene EF") | | | | | 58 |

Durometer hardness, Shore A

| Mix, watt-hrs./lb. | A | B | C | D | E |
|---|---|---|---|---|---|
| 0 | 72 | 80 | 89 | 91 | 91 |
| 20 | 75 | 84 | 90 | 91 | 90 |
| 40 | 75 | 84 | 90 | 92 | 90 |

Room temp.—Tensile, lb./in.$^2$

| | A | B | C | D | E |
|---|---|---|---|---|---|
| 0 | 1,640 | 1,880 | 2,450 | 2,230 | 1,670 |
| 20 | 2,280 | 1,920 | 2,700 | 2,590 | 1,840 |
| 40 | 1,890 | 2,560 | 2,780 | 2,760 | 2,000 |

220° F.—Tensile

| | | | | | |
|---|---|---|---|---|---|
| 0 | 95 | 104 | 147 | 210 | 150 |
| 20 | 207 | 443 | 636 | 646 | 344 |
| 40 | 177 | 475 | 889 | 803 | 432 |

260° F.—Tensile

| | | | | | |
|---|---|---|---|---|---|
| 0 | 41 | 52 | 66 | 133 | 104 |
| 20 | 128 | 324 | 491 | 495 | 291 |
| 40 | 106 | 369 | 702 | 662 | 368 |

Room temp.—Elongation, percent

| | | | | | |
|---|---|---|---|---|---|
| 0 | 200 | 190 | 80 | 60 | 40 |
| 20 | 120 | 230 | 80 | 80 | 40 |
| 40 | 190 | 120 | 80 | 70 | 40 |

220° F.—Elongation, percent

| | | | | | |
|---|---|---|---|---|---|
| 0 | 360 | 210 | 160 | 80 | 100 |
| 20 | 470 | 400 | 330 | 170 | 150 |
| 40 | 220 | 240 | 220 | 130 | 90 |

260° F.—Elongation, percent

| | | | | | |
|---|---|---|---|---|---|
| 0 | 230 | 180 | 160 | 50 | 70 |
| 20 | 480 | 420 | 340 | 150 | 140 |
| 40 | 210 | 230 | 230 | 110 | 80 |

100% modulus, lb./in.$^2$

| | | | | | |
|---|---|---|---|---|---|
| 0 | 750 | 1,250 | | | |
| 20 | 1,000 | 1,750 | | | |
| 40 | 1,100 | 1,800 | | | |

EXAMPLE IV

Example III was essentially repeated, except that the plasticizer was omitted, with similar results, as shown in Table V.

Table V
IRRADIATION OF TERPOLYMER
[Polymer feed: 80 vinyl chloride, 15 dilauryl maleate and 5 vinyl stearate]

| Mix | A | B | C | D | E |
|---|---|---|---|---|---|
| Terpolymer | 100 | 100 | 100 | 100 | 100 |
| Calcium stearate | 1 | 1 | 1 | 1 | 1 |
| "Philblack O" | | 25 | 50 | | |
| "Hi Sil" | | | | 54 | |
| "Silene EF" | | | | | 58 |

Rockwell hardness, "R" Scale

| Mix, watt-hrs./lb. | A | B | C | D | E |
|---|---|---|---|---|---|
| 0 | (¹) | 49 | 70 | 99 | 102 |
| 20 | 78 | 92 | 97 | 112 | 107 |
| 40 | 76 | 91 | 97 | 112 | 108 |

Room temp.—Tensile, lb./in.$^2$

| | A | B | C | D | E |
|---|---|---|---|---|---|
| 0 | 2,770 | 3,910 | 4,200 | 5,390 | 3,010 |
| 20 | 5,000 | 5,450 | 5,620 | 5,660 | 3,350 |
| 40 | 4,860 | 5,150 | 5,230 | 6,050 | 3,650 |

220° F.—Tensile, lb./in.$^2$

| | | | | | |
|---|---|---|---|---|---|
| 0 | 135 | 185 | 277 | 458 | 280 |
| 20 | 430 | 1,150 | 1,300 | 1,520 | 791 |
| 40 | 287 | 1,130 | 1,500 | 1,300 | 918 |

260° F.—Tensile, lb./in.$^2$

| | | | | | |
|---|---|---|---|---|---|
| 0 | 74 | 133 | 158 | 274 | 181 |
| 20 | 244 | 885 | 1,060 | 1,120 | 619 |
| 40 | 227 | 838 | 1,180 | 697 | 660 |

Table V—Continued
IRRADIATION OF TERPOLYMER—Continued

Room temp.—Elongation, percent

| | | | | | |
|---|---|---|---|---|---|
| 0 | 150 | 30 | 40 | 70 | 40 |
| 20 | 50 | 40 | 30 | 30 | 30 |
| 40 | 90 | 40 | 40 | 30 | 30 |

220° F.—Elongation, percent

| | | | | | |
|---|---|---|---|---|---|
| 0 | 260 | 180 | 180 | 90 | 110 |
| 20 | 290 | 320 | 220 | 90 | 110 |
| 40 | 160 | 180 | 140 | 70 | 60 |

260° F.—Elongation, percent

| | | | | | |
|---|---|---|---|---|---|
| 0 | 230 | 130 | 130 | 70 | 70 |
| 20 | 210 | 330 | 230 | 110 | 120 |
| 40 | 160 | 160 | 130 | 40 | 60 |

Room temp.—Tors. modulus, lb./in.$^2$

| | | | | | |
|---|---|---|---|---|---|
| 0 | 89,000 | 171,000 | 260,000 | 375,000 | 399,500 |
| 20 | 189,000 | 314,000 | 405,000 | 448,000 | 463,000 |
| 40 | 191,000 | 346,000 | 432,000 | 424,000 | 472,000 |

[1] Too soft.

EXAMPLE V

Vinyl chloride copolymer containing varying proportions of dilauryl maleate was compounded as shown in Table VI, and subjected to the treatment of the invention. Highly beneficial results were obtained, provided the proportion of dilauryl maleate was high enough. Irradiation quickly made the copolymer containing 10% of dilauryl maleate insoluble in cyclohexanone, indicating that extensive cross-linking occurred with moderate dosages of ionizing radiation.

Table VI
IRRADIATION OF VINYL CHLORIDE-DILAURYL MALEATE (DLM) COPOLYMERS

| Mix | A | B | C | D | E | F |
|---|---|---|---|---|---|---|
| Copolymer 10% DLM | 100 | 100 | | | | |
| Copolymer 4% DLM | | | 100 | 100 | | |
| Copolymer 2% DLM | | | | | 100 | 100 |
| Calcium stearate | 1 | 1 | 1 | 1 | 1 | 1 |
| Dioctyl phthalate | 40 | 40 | 50 | 50 | 50 | 50 |
| "Philblack O" | | 50 | | 50 | | 50 |

Durometer hardness, Shore A

| Mix watt-hrs./lb | A | B | C | D | E | F |
|---|---|---|---|---|---|---|
| 0 | 64 | 85 | 70 | 86 | 73 | 87 |
| 10 | 70 | 88 | 73 | 88 | 76 | 90 |
| 20 | 70 | 89 | 73 | 89 | 78 | 90 |
| 40 | 70 | 88 | 75 | 89 | 77 | 89 |

Room temp.—Tensile, lb./in.$^2$

| | A | B | C | D | E | F |
|---|---|---|---|---|---|---|
| 0 | 1,490 | 1,576 | 1,900 | 1,890 | 2,150 | 2,010 |
| 10 | 1,520 | 1,666 | 2,080 | 1,950 | 2,180 | 2,190 |
| 20 | 1,820 | 1,820 | 2,010 | 1,970 | 2,150 | 2,190 |
| 40 | 1,830 | 1,950 | 2,020 | 2,060 | 2,120 | 2,250 |

260° F.—Tensile, lb./in.$^2$

| | A | B | C | D | E | F |
|---|---|---|---|---|---|---|
| 0 | 51 | 93 | 86 | 131 | 69 | 116 |
| 10 | 72 | 104 | 96 | 155 | 82 | 188 |
| 20 | 100 | 159 | 108 | 190 | 145 | 195 |
| 40 | 178 | 376 | 126 | 242 | 130 | 191 |

Room temp.—Elongation, lb./in.$^2$

| | A | B | C | D | E | F |
|---|---|---|---|---|---|---|
| 0 | 310 | 110 | 320 | 110 | 330 | 110 |
| 10 | 300 | 80 | 330 | 130 | 340 | 120 |
| 20 | 340 | 100 | 330 | 130 | 330 | 130 |
| 40 | 320 | 90 | 320 | 110 | 310 | 120 |

260° F.—Elongation, percent

| | A | B | C | D | E | F |
|---|---|---|---|---|---|---|
| 0 | 250 | 150 | 240 | 170 | 230 | 170 |
| 10 | 350 | 160 | 310 | 210 | 270 | 230 |
| 20 | 460 | 300 | 320 | 240 | 320 | 240 |
| 40 | 550 | 380 | 420 | 330 | 320 | 240 |

EXAMPLE VI

Copolymers of vinyl chloride containing comonomers shown in Table VII were treated with ionizing radiation and then tested for cross-linking, by determining their solubility in cyclohexanone. Those copolymers coming within the scope of the invention showed unmistakable signs of appreciable crosslinking, in the form of insolubility or decreased solubility or low swelling index of the insoluble material, whereas those copolymers outside the scope of the invention revealed no appreciable cross-linking, at dosages sufficiently low to avoid injury to the copolymer. The results are summarized in Table VII.

Table VII
EFFECT ON CYCLOHEXANONE SOLUBILITY OF TREATMENT OF VINYL CHLORIDE COPOLYMERS WITH IONIZING RADIATION

| Comonomer | Percent in copolymer | Irradiation (watt-hrs. per lb.) | Crosslinking [1] |
|---|---|---|---|
| None (polyvinyl chloride with 50 parts dioctyl phthalate) | | 30 | Not cross-linked. |
| Dibutyl maleate | 37.2 | 30 | Cross-linked. |
| Di 2-ethylhexyl maleate | 35.2 | 30 | Do. |
| Di n-octyl maleate | 35.5 | 30 | Do. |
| Dilauryl maleate | 36.4 | 30 | Do. |
| Do | 22.4 | 30 | Do. |
| Di (methyl Cellosolve) maleate | 20.2 | 10 | Do. |
| Do | 20.2 | 30 | Do. |
| Vinyl-n-butyl ether | 17.7 | 30 | Not cross-linked |
| Vinyl dodecyl ether | 29.7 | 20 | Do. |
| Vinyl isotridecyl ether | 34.4 | 20 | Do. |
| Vinyl octadecyl ether | 33.7 | 30 | Cross-linked (very slightly soluble). |
| Methyl acrylate | 30.5 | 30 | Cross-linked. |
| Ethyl acrylate | 14 | 30 | Not cross-linked. |
| Butyl acrylate | 16 | 30 | Cross-linked. |
| 2-ethylhexyl acrylate | 19.5 | 20 | Do. |
| Methoxyethyl acrylate | 25 | 10 | Do. |
| | | 30 | Do. |
| Butoxyethyl acrylate | 31.5 | 10 | Do. |
| | | 30 | Do. |
| Methyl methacrylate | 15 | 30 | Not cross-linked. |
| | 59 | 30 | Do. |
| Butyl methacrylate | 34.5 | 30 | Cross-linked. |
| Vinyl acetate | 9.5 | 12.9 | Not cross-linked. |
| | 20.2 | 30 | Do. |
| Vinyl propionate | 8.8 | 12.9 | Cross-linked. |
| | 16.8 | 25.8 | Do. |
| Vinyl butyrate | 9.0 | 12.9 | Do. |
| | 17.2 | 25.8 | Do. |
| Vinyl hexanoate | 7.0 | 12.9 | Do. |
| | 13.5 | 25.8 | Do. |
| Vinyl laurate | 9.1 | 12.9 | Do. |
| | 13.5 | 25.8 | Do. |
| Vinyl stearate | 35.5 | 30 | Do. |

[1] As determined by solubility tests. Before treatment all copolymers were soluble.

EXAMPLE VII

A practical use of the beneficial modification of the properties of vinyl chloride interpolymers by ionizing radiation in accordance with the invention is in wire insulation. Copper wire was insulated with a terpolymer prepared from a monomer feed containing 80 parts vinyl chloride, 15 parts dilauryl maleate and 5 parts vinyl stearate. The wire was treated with various exposures of high speed electrons. Subsequent to the treatment, a test was made of the high temperature distortion of the insulation. This was made by exposing a section of the copper wire, heating it with a hot soldering iron then grasping the insulation next to the heated wire with a pair of pliers. Observations were as follows:

Radiation treatment:     Effect of pliers on Insulation
- None —————— Insulation flattened and bare wire exposed.
- 8 watt-hours/lb. —————— Insulation flattened but wire not exposed.
- 16 watt-hours/lb. —————— Marks of pliers barely show.
- 24 watt-hours/lb. —————— No effect on insulation.

Thus, the serviceability of the wire was much improved by the radiation treatment. In addition to making the wire much easier and safer to handle in splicing operations such treated wire would be much more resistant to damage resulting from temporary current overloads of the wire or other cause of overheating.

Preferred terpolymers for use in the invention are those formed from a monomeric mixture containing from 50 to 95% of vinyl chloride, the balance of the monomeric mixture being made up of a vinyl ester of a saturated aliphatic acid having from 8 to 18 carbon atoms per molecule, and a dialkyl maleate having from 7 to 18 atoms in each alkyl group, the ratio of such vinyl ester to such dialkyl maleate being from 15 to 1 to 1 to 15. Vinyl stearate and dilauryl maleate are especially preferred monomers in this form of the invention. Particularly preferred products result from use of a terpolymer of 80 parts vinyl chloride, 20 parts vinyl stearate plus dilauryl maleate, the ratio of the vinyl stearate to the dilauryl maleate being from 3:1 to 1:3.

Having thus described my invention, what I claim and desire to protect by Letters Patent is:

1. A method which comprises providing a plastic composition comprising a previously prepared resinous copolymer resulting from the polymerization of a mixture of 95% to 50% of vinyl chloride and correspondingly 5% to 50% of monomer copolymerizable therewith selected from the group consisting of
    (a) dialkyl maleates in which each alkyl group contains from 4 to 20 carbon atoms;
    (b) vinyl esters of fatty acids in which the fatty acid contains from 3 to 20 carbon atoms;
    (c) vinyl alkyl ethers in which the alkyl group contains from 18 to 30 carbon atoms;
    (d) alkyl acrylates in which the alkyl group contains from 1 to 20 carbton atoms; and
    (e) alkyl methacrylates in which the alkyl group contains from 3 to 20 carbon atoms, thereafter shaping the said composition into a desired form, and subsequently subjecting the formed composition to a dosage of 5 to 50 watt-hours per pound of said composition of ionizing radiation having an energy level equivalent to at least 8 electron volts, whereby the said copolymer is cross-linked and said composition is improved in physical properties.

2. A method as in claim 1 in which the said composition comprises 5 to 80 parts, per 100 parts of copolymer, of carbon black as a reinforcing filler.

3. A method as in claim 1, in which said copolymer is a terpolymer of vinyl chloride, a vinyl ester of a saturated aliphatic monocarboxylic acid, said acid having from 8 to 18 carbon atoms per molecule, and a dialkyl maleate having from 7 to 18 carbon atoms in each alkyl group, said terpolymer being formed from a monomeric mixture containing from 50 to 95% of vinyl chloride, the balance of said monomeric mixture being made up of said vinyl ester and said dialkyl maleate in a ratio of from 15 to 1 to 1 to 15.

4. A method as in claim 3, in which the said vinyl ester is vinyl stearate and the said dialkyl maleate is dilauryl maleate.

5. A method as in claim 3, in which the said terpolymer is derived from a monomeric mixture of 80 parts of vinyl chloride and 20 parts of vinyl stearate plus dilauryl maleate, the ratio of vinyl stearate to dilauryl maleate being from 3:1 to 1:3.

6. A shaped plastic composition comprising a resinous copolymer of 95% to 50% of vinyl chloride and correspondingly 5% to 50% of monomer copolymerizable therewith selected from the group consisting of
    (a) dialkyl maleates in which each alkyl group contains from 4 to 20 carbon atoms;
    (b) vinyl esters of fatty acids in which the fatty acid contains from 3 to 20 carbon atoms;
    (c) vinyl alkyl ethers in which the alkyl group contains from 18 to 30 carbon atoms;
    (d) alkyl acrylates in which the alkyl group contains from 1 to 20 carbon atoms; and
    (e) alkyl methacrylates in which the alkyl group contains from 3 to 20 carbon atoms, cross-linked by 5 to 50 watt-hours per pound of said composition of ionizing radiation having an energy level equivalent to at least 8 electron volts, said cross-linked composition being insoluble in cyclohexanone, and being characterized by enhanced tensile strength, elongation, and resistance to flow under stress at elevated temperatures, in comparison with the same composition not cross-linked by said ionizing radiation.

7. A shaped plastic composition as in claim 6, in which the said copolymer is a terpolymer of vinyl chloride, a vinyl ester of a saturated aliphatic monocarboxylic acid, said acid having from 8 to 18 carbon atoms per molecule, and a dialkyl maleate having from 7 to 18 atoms in each alkyl group, said terpolymer being formed from a monomeric mixture containing from 50 to 95% of vinyl chloride, the balance of said monomeric mixture being made up of said vinyl ester and said dialkyl maleate in a ratio of from 15 to 1 to 1 to 15.

8. A shaped plastic composition as in claim 7, in which the said terpolymer is derived from a monomeric mixture of 80 parts of vinyl chloride and 20 parts of vinyl stearate plus dilauryl maleate, the ratio of vinyl stearate to dilauryl maleate being from 3:1 to 1:3.

References Cited in the file of this patent

UNITED STATES PATENTS

| | | |
|---|---|---|
| 2,505,068 | Sachs et al. | Apr. 25, 1950 |
| 2,668,133 | Brophy et al. | Feb. 2, 1954 |
| 2,670,483 | Brophy | Mar. 2, 1954 |
| 2,803,598 | Black et al. | Aug. 20, 1957 |
| 2,845,404 | Garner et al. | July 29, 1958 |

FOREIGN PATENTS

| | | |
|---|---|---|
| 732,047 | Great Britain | June 15, 1955 |
| 742,933 | Great Britain | Jan. 4, 1956 |
| 761,051 | Great Britain | Nov. 7, 1956 |
| 784,624 | Great Britain | Oct. 9, 1957 |

OTHER REFERENCES

Harrington: HW–44092, "Plastics and Elastomers for Use in Radiation Fields," pages 4, 15, 16, 29, 40, Nov. 30, 1956.

"Chem. and Eng. News," vol. 33, pages 5091–92, Nov. 21, 1955.

Schildknecht: "Vinyl and Related Polymers," pages 400–412 (1952).